United States Patent Office 3,417,943
Patented Dec. 24, 1968

3,417,943
AIR JET THRUST SUPPORTED CRAFT
Frederick William Page, Raymond Frederick Creasey, and Joseph Thomas Froud, Lytham St. Annes, England, assignors to British Aircraft Corporation (Operating) Limited, London, England
Continuation-in-part of application Ser. No. 150,095, Nov. 3, 1961. This application Dec. 4, 1964, Ser. No. 416,162
Claims priority, application Great Britain, Nov. 18, 1960, 39,833/60; Aug. 30, 1961, 31,277/61
13 Claims. (Cl. 244—23)

ABSTRACT OF THE DISCLOSURE

A temporary ground effect cushion supported vehicle having a prime mover capable of generating a sustained gaseous jet thrust of a magnitude less than the weight of said vehicle, a plurality of nozzles disposed along the perimeter of the vehicle producing a static height near the ground, resulting in a thrust less than the height of the vehicle, energy storage means installed in the vehicle capable of temporarily increasing the thrust of said gaseous jet curtain to a magnitude exceeding the weight of the vehicle, propulsive gaseous jet producing means installed in the vehicle and in operation imparting a substantially horizontal thrust to the vehicle for enabling the vehicle to leap over an obstacle of up to a predetermined length and height, and then returning to a static height beyond said obstacle, wherein the ratio of the thickness of the curtain to the equivalent-diameter of the vehicle is given as a ratio within a specified range.

---

The present invention relates to a continuation-in-part of the patent application Ser. No. 150,095 filed on Nov. 3, 1961 by Frederick William Page, Raymond Frederick Creasey and Joseph Thomas Froud for Air Jet Supported Vehicles and now abandoned.

In order to be capable of free flight independent of ground effect such vehicles are known to require a power plant capable of producing a sustained vertical thrust exceeding the weight of the vehicle. The costs of the power installation and in fuel consumption of such vehicles are obviously very high.

It is also known to use the ground effect of a peripheral jet emerging from the base of a vehicle for increasing beyond the ambient pressure the pressure acting on the area enclosed by a jet curtain surrounding said area, and thus to support a vehicle at a low height above ground called static or steady height by a force which is the resultant of the dynamic thrust of said jet curtain and of the static pressure of the gaseous cushion trapped within the periphery of said jet curtain, each of these components being less than the weight of the vehicle. However, the height at which such ground effect cushion vehicles can sustain themselves is in strict relationship to the area enclosed by said jet curtain, which area has to be large, if the static or steady height, at which the vehicle can support itself, is of a practically sufficient magnitude for a given thrust.

As distinguished from the prior art, the present invention has the main object of providing a temporarily ground effect cushion supported land vehicle, which is moreover capable of leaping to a multiple of its static or steady height and over obstacles of a given length and height.

With this and other objects in view which will become apparent later from this specification and the accompanying drawings, we provide a temporarily ground effect cushion supported vehicle comprising in combination: a vehicle body, a prime mover and a gaseous energy generating means coupled to it installed in said body and capable of generating a sustained gaseous jet thrust of a magnitude less than the weight of said vehicle, a plurality of nozzles positioned along the perimeter of said body and in supply connection with said gaseous energy generating means, said nozzles in steady operation at a static height near the ground producing a substatially vertical gaseous jet curtain of a thrust less than the weight of said vehicle and enclosing a ground effect cushion at the bottom thereof, the combined thrust of said curtain and static pressure of said ground effect cushion supporting said vehicle at said static height, energy storage means installed in said body capable of temporarily increasing the thrust of said gaseous jet curtain to a magnitude exceeding the weight of said vehicle, and propulsive gaseous jet producing means installed in said body and in operation imparting a substantially horizontal thrust to said vehicle, said combination of vertical and horizontal jet thrust means enabling said vehicle to leap over an obstacle of up to predetermined length and height, returning to a static height beyond said obstacle, such a vehicle will be referred to as a leap vehicle.

The required forward speed is determined by the length of the obstacle, while the allowable height of the obstacle depends on the installed thrust power and on the starting height for the leap. Theoretically, the height of the leap may be several times the steady hover height, but practical limitations of allowable vertical accelerations and restraints owing to an excess rate of change of volume of air beneath the vehicle enclosed by the jet curtain are believed to limit the height attainable in the leap to the order of three times the steady height.

For example, an obstacle 10 feet high and 30 feet long may be cleared with an installed thrust power of approximately three quarters of the weight of the leap vehicle, and at a forward speed of at least 10 miles per hour.

In order to compare vehicles of different plan form with one another the area enclosed by the jet curtain is defined by the "equivalent-diameter" of a circle circumscribed to a circular jet curtain of equal area. The ratio of height to said equivalent diameter and the ratio of curtain thickness to said equivalent-diameter will be used as parameters hereinafter.

A development of the present invention is based on the discovery that as the static height for a given configuration increases, the curtain area as a proportion to the total base area must increase, if the installed power to generate the jet curtain is to be kept a minimum. Also in order to leap to a given height with a minimum power, the cross sectional area of the jet curtain must be of a certain relationship to the area of the ground effect cushion enclosed by said curtain. The ratio of cross sectional area of the jet curtain to the area of the ground effect cushion enclosed by said curtain is according to this development of the present invention greater than that used on known ground effect vehicles. It can be shown that for support at a given height (up to half the equivalent-diameter of the vehicle) the curtain percentage thickness in terms of the equivalent-diameter equals the percentage height in equivalent-diameters, i.e.

$$t/D_o' = h/D_o' \text{ or } t = h$$

In these equations $t$ is the thickness of the air curtain measured across the jet curtain surrounding the ground effect cushion at the level of its leaving the vehicle, $h$ is the distance between the ground and the underside of the vehicle, and $D_o'$ is the "equivalent-diameter" i.e. the outer diameter of a vehicle circular in plan form having the same area in plan as the actual vehicle, the plan form of which is not necessarily circular.

For example for a vehicle capable of hovering at a height of $\frac{1}{10}$ of its equivalent-diameter the curtain thickness $t$ is to be substantially also equal to $\frac{1}{10}$ of said equivalent-diameter. As the static height changes, the optimum thickness of the curtain changes in the same manner.

These and other features of our said invention will be clearly understood from the following description of an embodiment thereof given by way of example with reference to the accompanying drawings, in which:

FIG. 1 is a graph plotting the ratio of vertical lift (i.e. total weight lifted) to the vertical jet thrust against the steady height (in feet) for a given plan form and area.

FIG. 2 diagrammatically indicates a leap of a leap vehicle according to the invention over a given obstacle at a given speed.

Figure 1:
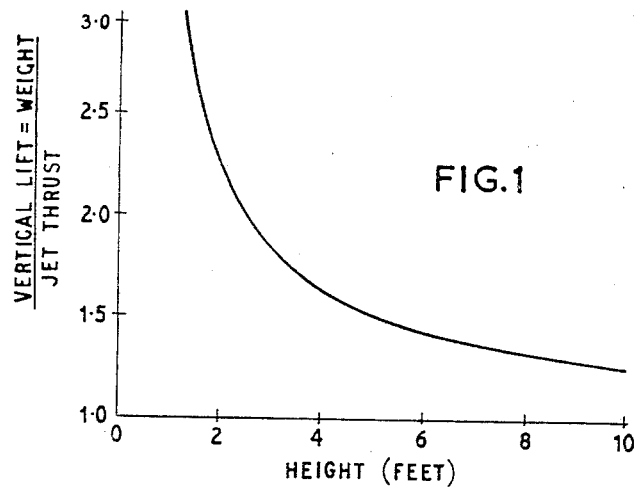
Figure 2:
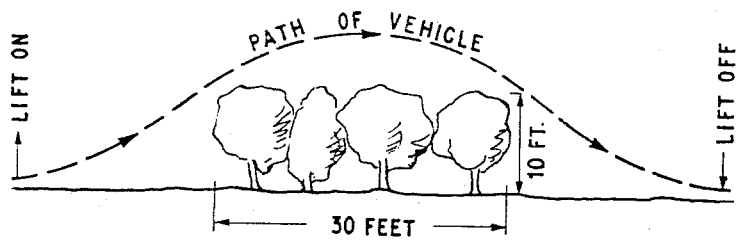
Figure 3:
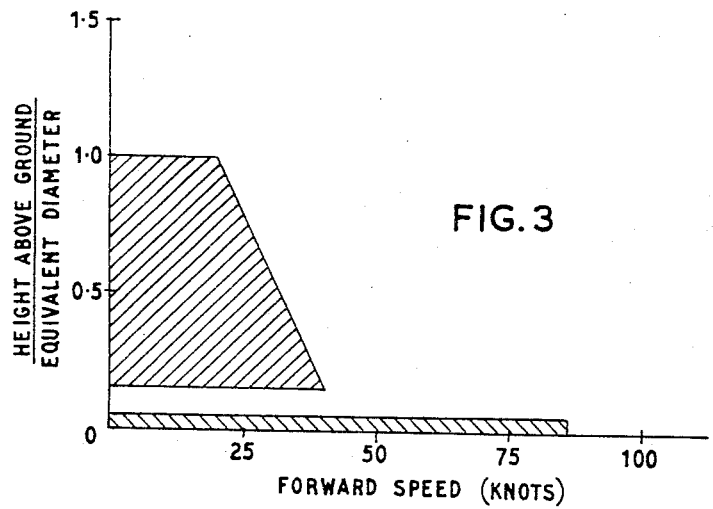
FIG. 3 is a graph plotting the ratio of height above ground to equivalent-diameter against forward speed in knots for a known ground effect vehicle and for a leap vehicle according to the present invention, respectively.
Figure 4:
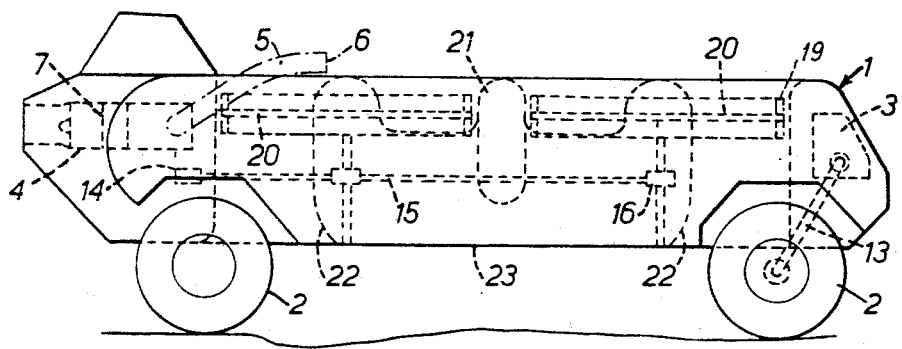
FIGS. 4 and 5 are a diagrammatic side elevation and plan view, respectively, of an embodiment of the leap vehicle according to the present invention.
Figure 5:
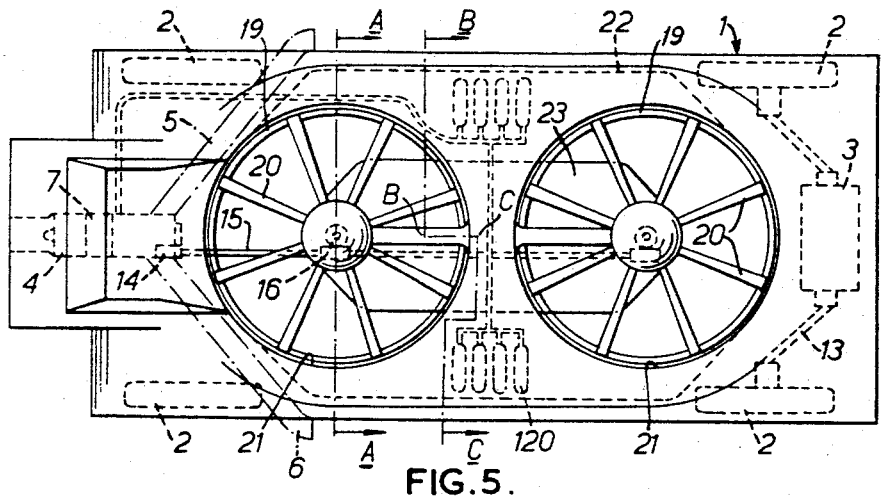

Referring firstly to FIGS. 1 to 3 of the accompanying drawings, FIG. 1 shows the well known ground effect on total lift for support at static height, this ground effect being directly proportional to the area enclosed by the jet curtain.

FIG. 2 shows the trajectory of a leap vehicle according to the invention from the moment of applying the lifting thrust to the moment of turning off this thrust after the leap vehicle has cleared an obstacle, illustrated for example as a group of trees 10 feet high and 30 feet in the horizontal direction of movement.

FIG. 3 shows that for a conventional ground effect cushion vehicle the ratio of height above ground to the equivalent-diameter of the area enclosed by the jet curtain is of a very low constant value regardless of the forward speed, while for a leap vehicle according to the present invention the said ratio is a high multiple of that for conventional ground effect cushion vehicles for forward speeds up to 20 knots, and then drops to a value of about three times that of conventional ground effect cushion vehicles at a forward speed of about 40 knots.

Referring now to the embodiment of a leap vehicle according to the present invention illustrated in the FIGS. 4 to 7, a cross-country army reconnaissance vehicle 1 runs on the ground on four road wheels 2 driven by an internal combustion engine 3 through articulated drive shafts 13. A gas turbine having a compressor 7 and whose exhaust is directed through rearward ducts 5 to efflux nozzles 6 arranged on the sides of the vehicle, produces a forward thrust when the vehicle is airborne, and is coupled through reduction gearing 14, a shaft 15 and two worm gears 16 to two multi-bladed rotors 20 journalled about vertical axes in ducts, which are circular at their intakes 21, but have the shape of two opposite horseshoes at their outlets 22 of a width $t$ and separated from one another by a longitudinal central island 23. The outer perimeter of the horseshoe shaped ducts 22 encloses the area $A_T$ of the ground effect cushion, while $A_J$ is the area of the ribbon shaped curtain of the width $t$.

The rotors 20 may have flywheel rims 18 and adjustable pitch blades known per se. When approaching the obstacle to be cleared while running on the road wheels 2, with the gas turbine 4 running and the rotors 20 feathered, the rotors are suddenly set to a coarse pitch, the extra energy required for driving them at this pitch being supplied by the inertia of the flywheel rims 19, and the leap vehicle becomes airborne, its speed of running on the ground providing a forward component, which is kept up by the thrust of the exhaust from the efflux nozzles 6 of the gas turbine 4. Nozzles and/or vanes in the air flow of the fans 20 may be provided as known per se for stabilization and control of the forward speed of the vehicle while airborne (not shown in the diagrammatic FIGS. 4 to 7).

Figure 6:
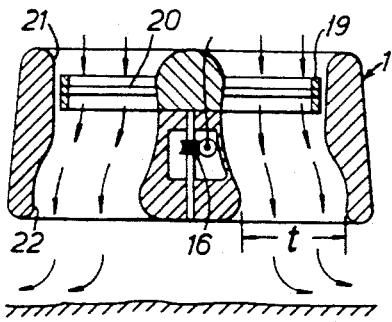
FIGS. 6 and 7 are diagrammatic transverse sections on the lines A—A, and B—B, C—C of FIG. 5, respectively.
Figure 7:
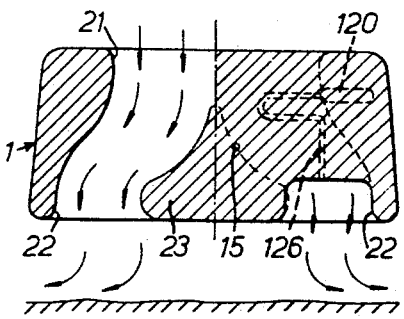

In FIGS. 6 and 7 the ducts 21, 22 are shown to be shaped so as to provide substantially constant cross sectional areas for the air flow in spite of the transition from two rings at the entries 21 to the two opposite horseshoes 22 at the outlets. The arrows indicate the air flow which is substantially vertically downward at the entries and is deflected horizontally from the regions of high pressure in the center of the leap vehicle so as to produce the ground effect cushion at the beginning and end of the leap. Other forms of nozzles as those shown, for example ejector nozzles known per se may be used, if desired.

Figure 8:
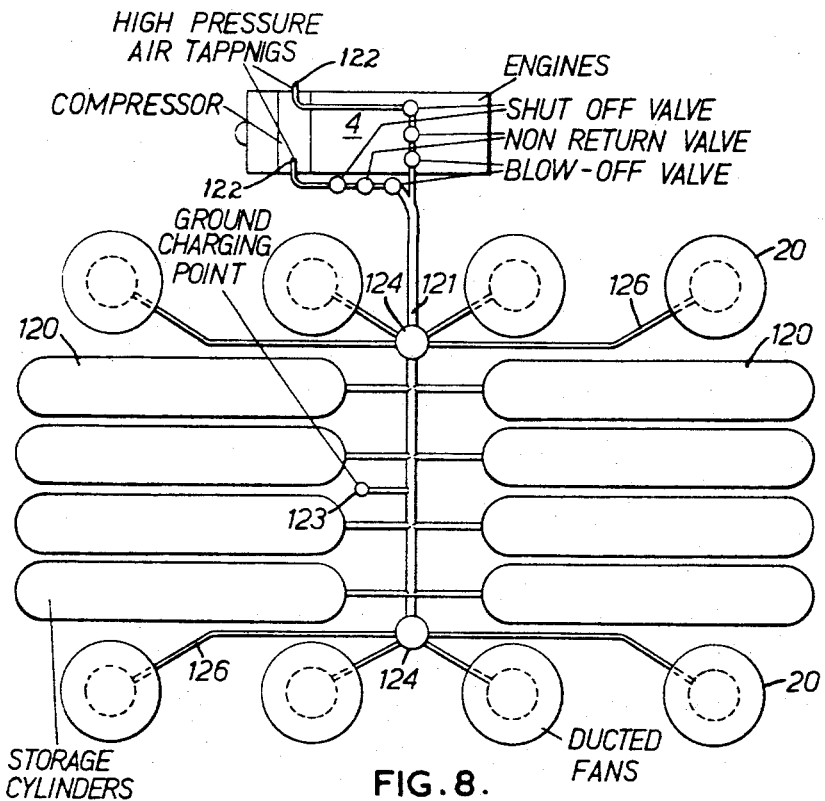
FIG. 8 is a diagrammatic plan view of compressed air storage means as additional energy supply means for the leap of the vehicle according to the present invention.

Energy may be stored in the form of compressed air to be released for producing an additional vertical thrust for the leap. As shown in FIG. 8, storage cylinders or bottles 120 are connected in parallel to a manifold 121 leading to high pressure tappings 122 of the compressor 7 of the gas turbine engine 4, with the usual shut-off valve, non-return valve and blow-off valve interposed. Alternatively an auxiliary compressor to be coupled to the internal combustion engine 3, which drives the vehicle on the ground, may be used. Compressed air is stored in the cylinders or bottles 120 during the ground run. A ground charging point 123 may also be provided. Through a selector valve 124 controlled by the driver of the vehicle, the nozzles 22 of the ducted fans 20 producing in operation the gaseous jet curtain (FIGS. 6, 7) can be connected to said manifold 121 by means of compressed air pipes 126 (FIG. 8) in order to supply additional energy to the efflux from the variable pitch ducted fans 20, whose pitch is increased for the leap.

Figure 9:
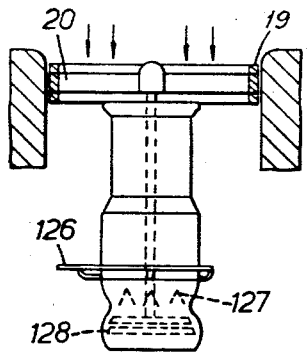
FIG. 9 is a diagrammatic elevation of an alternative embodiment, wherein compressed air is supplied to an auxiliary gas turbine in driving connection with a ducted fan.

Alternatively, the compressed air may be supplied to a turbine 128 as shown in FIG. 9 which is operatively connected with the ducted fan 20. This turbine may be an air turbine converting the energy stored in the compressed air into mechanical energy or, preferably, an auxiliary gas turbine, whose burners 127 are supplied with fuel simultaneously with the opening of the supply of compressed air through the pipe 126, and with the setting of the blades of the ducted fan 20 from fully feathered to coarse pitch.

Figure 10:
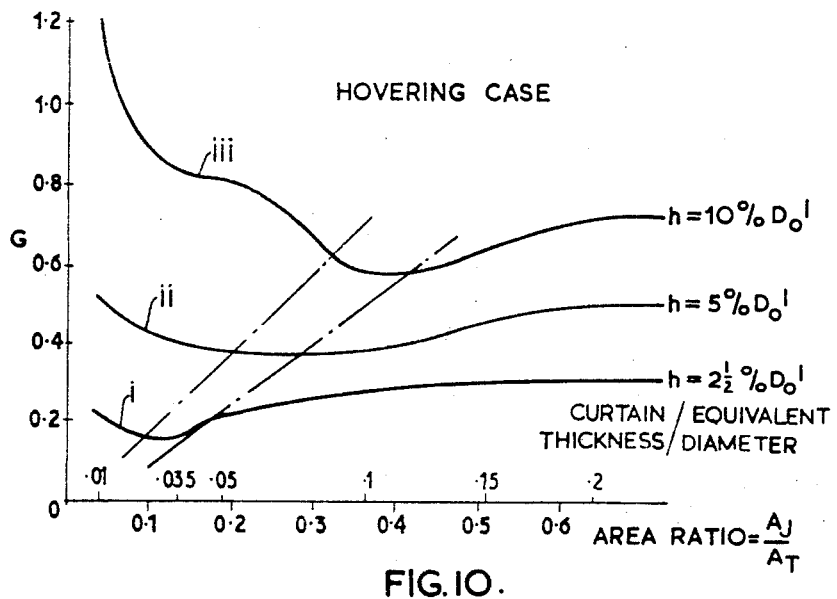
FIG. 10 is a graph plotting a parameter G proportional to the stream horse power of the air jet thrust against area ratio $A_J/A_T$ and against the ratio of curtain thickness to equivalent-diameter $t/D_0'$ for support at static height.
Figure 11:
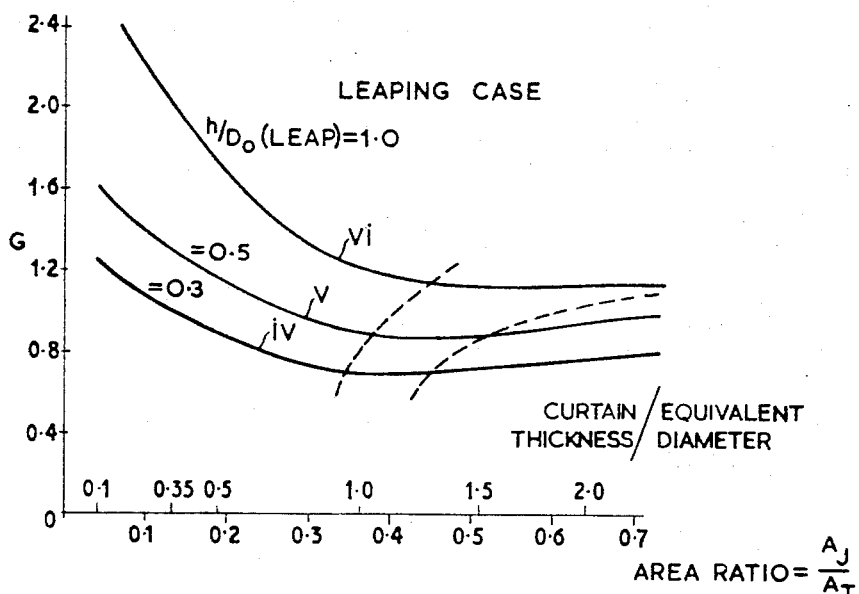
FIG. 11 is a graph similar to FIG. 10 for leap performance.
Figure 12:
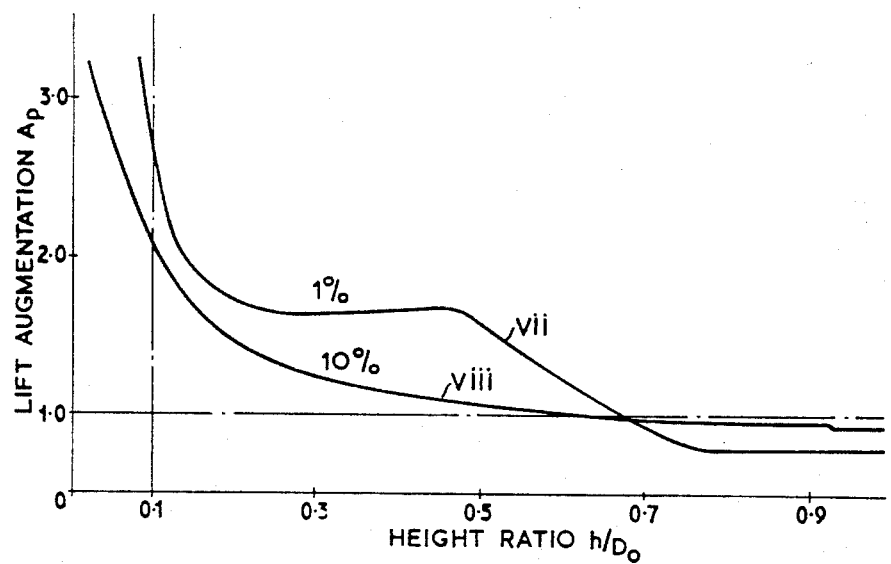
FIG. 12 is a graph plotting static lift augmentation $A_p$ against the ratio of height to diameter for circular plan, the vehicles according to FIGS. 4–7 being of non-circular plan form of equivalent-diameter.

Referring now to FIGS. 10 to 12 of the accompanying drawings, in FIG. 10 the abscissae represent the area ratio $A_J/A_T$, wherein $A_J$ is the cross-sectional area of the jet curtain itself and $A_T$ is the area of the ground effect cushion enclosed by the outer boundary of said curtain. A dimensionless parameter of the curtain thickness $t$ measured across said jet curtain divided by the equivalent-diameter $D_0'$ of the vehicle is also indicated on the abscissae axis. $D_0'$ is the outeside equivalent-diameter related to $A_T$. The ordinate G represents a parameter which is proportional to the stream horse power (HP's) of the curtain in accordance with the equation:

$$G = 1100 \text{ HP's } (\rho A_T)^{1/2}/L^{3/2}$$

wherein $\rho$ is the density of the gaseous medium forming the jet curtain and L is the total lift, i.e. the resultant of the dynamic thrust from the jet curtain plus the static lift from the excess pressure of the ground effect cushion over the ambient atmosphere, in lbs. units.

Three graphs *i*, *ii* and *iii* have been shown in full lines for the ratio of hovering height $h$ to equivalent-diameter $D_o'$ of 0.025, 0.050 and 0.100, respectively, based on wind tunnel measurements showing the parameter G in dependence of the area ratio $A_J/A_T$ or of the percentual curtain thickness. Chain-dotted lines bound the minima of G for different hovering heights. It will be seen that the graph *i*, which corresponds to the ratio $h/D_o'$ of 0.025 as usual for ordinary ground effect vehicles has in a pronounced minimum at an area ratio of about 0.1, while in graph *iii* for the ratio $h/D_o'$ of 0.1, for which the present leap vehicle is primarily designed, the minimum of G is at an area ratio of about 0.4. For the intermediate graph *ii* corresponding to $h/D_o'$ of 0.05 the minimum is not marked but lies between the values for graph *i* and graph *iii*. It follows from FIG. 10 that the optimum area ratio and hence optimum curtain thickness is approximately proportional to the ratio $h/D_o'$ namely four times greater for four times the ratio of static height to equivalent-diameter.

FIG. 11 plots a parameter G expressed by the equation $$G = 1100 \text{ HP}_{SL} (\rho A_T)^{1/2}/W^{3/2}$$

wherein $\text{HP}_{SL}$ is the stream horse power at the leap and W is the weight in lbs. units, against the area ratio $A_J/A_T$ for a leap performance from an initial static hover height ratio of $h/D_o'$ of 0.10. The three graphs, *iv*, *v* and *vi* correspond to height ratios $h/D_o'$ of the leap of 0.3, 0.5 and 1, respectively, and have been obtained by integrating the area under the static lift augmentation graphs of FIG. 11. This area is proportional to the energy available for the leap.

The minima of the graphs *iv* to *vi* are not so pronounced as those of the graphs *i* and *iii* of FIG. 10. Their range is also bounded by two dotted lines.

In FIG. 12 static lift augmentation $A_p$ is plotted against the ratio of height to equivalent-diameter $h/D_o'$ for a circular plan form vehicle with a thick annular jet curtain according to the invention (graph *viii*) as compared with the usual thin annular jet curtain (graph *vii*). Lift augmentation $A_p$ is defined as the measured total lift divided by a datum thrust based on constant power. It will be noted that at height ratios $h/D_o'$ below about 0.7 the conventional thin curtain of $t/D_o'$ gives a bigger lift augmentation than the thick curtain of $t/D_o' = 0.1$ according to the present invention. However, at height ratios above 0.7, for which the leap vehicle according to the present invention is designed, the lift augmentation by a thick curtain considerably exceeds that attainable by a thin curtain.

Moreover, graph *vii* for the thin jet curtain shows in the range from about $h/D_o' = 0.3$ to 0.45 that the curve slopes upward, which indicates instability in static support since increasing height results in increased lift, and vice versa. In contrast, graph *viii* continuously slopes down with increasing height to equivalent-diameter ratio and thus ensures stability of static support at any altitude occurring in practice.

While we have described herein and illustrated in the accompanying drawings what may be considered a typical and particularly useful embodiment of our said invention, we wish to be understood that we do not limit ourselves to the particular details and dimensions described and illustrated: for obvious modifications will occur to a person skilled in the art.

What we claim as our invention and desire to secure by Letters Patent, is:

1. A temporarily ground effect cushion supported vehicle comprising in combination: a vehicle body, a prime mover and gaseous energy generating means coupled to it installed in said body and capable of generating a sustained gaseous jet thrust of a magnitude less than the weight of said vehicle, a plurality of nozzles positioned along the perimeter of said body and in supply connection with said gaseous energy generating means, said nozzles in steady operation at a static height near the ground producing a substantially vertical gaseous jet curtain of a thrust less than the weight of said vehicle and enclosing a ground effect cushion at the bottom thereof, the combined thrust of said curtain and static pressure of said ground effect cushion supporting said vehicle at said static height, energy storage means installed in said body capable of temporarily increasing the thrust of said gaseous jet curtain to a magnitude exceeding the weight of said vehicle, and propulsive gaseous jet producing means installed in said body and in operation imparting a substantially horizontal thrust to said vehicle, said combination of vertical and horizontal jet thrust means enabling said vehicle to leap over an obstacle up to a predetermined length and height, returning to a static height beyond said obstacle, wherein the ratio of the thickness of said curtain to the equivalent-diameter of said vehicle being substantially proportional to the ratio of static height to said equivalent-diameter.

2. A vehicle as claimed in claim 1, wherein said gaseous energy generating means comprise at least one vertical ducted fan.

3. A vehicle as claimed in claim 1, wherein said gaseous energy generating means comprise vertical ducted fans arranged one behind the other on the longitudinal centre line of the vehicle.

4. A vehicle as claimed in claim 1, wherein said energy storage means comprise bottles in operation containing a compressed gas and valve means controlling the discharge of compressed gas from said bottles, said valve means being connected with said nozzles producing said gaseous jet curtain.

5. A vehicle as claimed in claim 1, wherein said energy storage means comprise bottles in operation containing compressed air, said vehicle comprising a compressor capable of being coupled with said prime mover and of charging said compressed air bottles, and valve means controlling the connection of said compressors with said bottles and the discharge of compressed air from the latter for temporarily increasing the thrust of said jet curtain.

6. A vehicle as claimed in claim 1, wherein road wheels journalled on the vehicle body support the said body on the ground.

7. A temporarily ground effect cushion supported vehicle comprising in combination: a vehicle body, a prime mover and gaseous energy generating means coupled to it installed in said body and capable of generating a sustained gaseous jet thrust of a magnitude less than the weight of said vehicle, a plurality of nozzles positioned along the perimeter of said body and in supply connection with said gaseous energy generating means, said nozzles in steady operation at a static height near the ground producing a substantially vertical gaseous jet curtain of a thrust less than the weight of said vehicle and enclosing a ground effect cushion at the bottom thereof, the combined thrust of said curtain and static pressure of said ground effect cushion supporting said vehicle at said static height, energy storage means installed in said body capable of temporarily increasing the thrust of said gaseous jet curtain to a magnitude exceeding the weight of said vehicle, and propulsive gaseous jet producing means installed in said body and in operation imparting a substantially horizontal thrust to said vehicle, said combination of vertical and horizontal jet thrust means enabling said vehicle to leap over an obstacle up to a predetermined length and height, returning to a static height beyond said obstacle, wherein the ratio of the thickness of said curtain to the equivalent-diameter of said vehicle being substantially equal to one tenth of the ratio of static height to said equivalent-diameter.

8. A vehicle as claimed in claim 7, wherein said gaseous energy generating means comprise at least one vertical ducted fan.

9. A vehicle as claimed in claim 7, wherein said gaseous energy generating means comprise vertical ducted fans arranged one behind the other on the longitudinal centre line of the vehicle.

10. A vehicle as claimed in claim 7, wherein said energy storage means comprise bottles in operation containing a compressed gas and valve means controlling the discharge of compressed gas from said bottles, said valve means being connected with said nozzles producing said gaseous jet curtain.

11. A vehicle as claimed in claim 7, wherein said energy storage means comprise bottles in operation containing compressed air, said vehicle comprising a compressor capable of being coupled with said prime mover and of charging said compressed air bottles, and valve means controlling the connection of said compressors with said bottles and the discharge of compressed air from the latter for temporarily increasing the thrust of said jet curtain.

12. A vehicle as claimed in claim 7, wherein road wheels journalled on the vehicle body support the said body on the ground.

13. A temporarily ground effect cushion supported vehicle comprising in combination: a vehicle body, a prime mover and gaseous energy generating means coupled to it installed in said body and capable of generating a sustained gaseous jet thrust of a magnitude less than the weight of said vehicle, a plurality of nozzles positioned along the perimeter of said body and in supply connection with said gaseous energy generating means, said nozzles in steady operation at a static height near the ground producing a substantially vertical gaseous jet curtain of a thrust less than the weight of said vehicle and enclosing a ground effect cushion at the bottom thereof, the combined thrust of said curtain and static pressure of said ground effect cushion supporting said venicle at said static height, energy storage means installed in said body capable of temporarily increasing the thrust of said gaseous jet curtain to a magnitude exceeding the weight of said vehicle, and propulsive gaseous jet producing means installed in said body and in operation imparting a substantially horizontal thrust to said vehicle, said combination of vertical and horizontal jet thrust means enabling said vehicle to leap over an obstacle up a predetermined length and height, returning to a static height beyond said obstacle, wherein said gaseous energy generating means comprise a variable pitch ducted fan, having a flywheel rim, said flywheel rim of said fan constituting said energy storage means and supplying the additional energy required when adjusting said fan from fully feathered to coarse pitch.

References Cited

UNITED STATES PATENTS

| 3,065,935 | 11/1962 | Dubbury et al. | 180—7 |
| 3,117,747 | 1/1964 | Creasey et al. | 180—7 X |
| 3,252,534 | 5/1966 | Shaw | 180—7 |
| 3,269,476 | 8/1966 | Jones | 180—7 |

A. HARRY LEVY, *Primary Examiner.*

U.S. Cl. X.R.

180—119